United States Patent [19]

Narcisco, Jr.

[11] Patent Number: 5,237,638
[45] Date of Patent: Aug. 17, 1993

[54] SILICONE OPTICAL WAVEGUIDE
[75] Inventor: Hugh L. Narcisco, Jr., Santa Barbara, Calif.
[73] Assignee: PDT Systems, Goleta, Calif.
[21] Appl. No.: 669,470
[22] Filed: Mar. 14, 1991
[51] Int. Cl.⁵ .............................................. G02B 6/02
[52] U.S. Cl. .................................................. 385/123
[58] Field of Search ............... 350/96.29, 96.30, 96.23, 350/96.10; 128/4, 6; 362/32; 385/123, 115, 116, 117, 102

[56] References Cited
U.S. PATENT DOCUMENTS

| | | | |
|---|---|---|---|
| 4,367,918 | 1/1983 | Pinnow | 350/96.30 |
| 4,689,248 | 8/1987 | Traver et al. | 427/168 |
| 4,718,748 | 1/1988 | Broer et al. | 350/96.30 |
| 4,883,338 | 11/1989 | Abe et al. | 350/96.34 |
| 4,904,053 | 2/1990 | Kinaga et al. | 385/145 |
| 4,969,709 | 11/1990 | Sogawa et al. | 385/118 |
| 5,018,829 | 5/1991 | Ogawa | 350/96.34 |

Primary Examiner—Frank Gonzalez
Attorney, Agent, or Firm—Michael G. Petit

[57] ABSTRACT

An optical waveguide having a large diameter silicone core for transmission of visible and infrared light is described. The silicone-cored optical waveguide is generally useful for the conduction of light from a source to one or more remote distribution points for illumination. It is particularly useful for conducting light to areas of the body remote from the light source for medical application. The use of optically transparent silicone as the optical waveguide's core material enables the construction of an improved fiber having greater flexibility than a glass or plastic cored waeguide of the same diameter thereby enabling passage along a fortuous path. In the preferred embodiment, a silicone-cored waveguide is described which has large core diameter and a high degree of flexibility when compared to a glass fiber of similar core diameter. The preferred embodiment is particularly useful for intravascular intraluminal, interstitial and intracavity medical applications and generally useful for the conduction and distribution of light in a distribution system requiring flexible conductors.

1 Claim, 1 Drawing Sheet

SILICONE OPTICAL WAVEGUIDE

BACKGROUND OF THE INVENTION

1. Field of the Invention

This invention relates to optical fibers having a silicone core. More precisely, this invention relates to optical fibers having a large diameter silicone core capable of bending and twisting as is frequently required in medical and commercial illumination applications.

2. Description of the Prior Art

The use of optical fibers, hereinafter alternatively referred to as "optical waveguides" or simply "waveguides," has become very common since the mid-1970's when Corning first produced a highly pure form of glass which had the ability to transmit light energy. Since then, glass of varying chemical compositions has been developed to transmit light in wavelengths from the ultraviolet to the far infrared regions of the electromagnetic spectrum. Optical waveguides are currently fabricated from various forms of glass and plastic materials such as polymethylmethacrylate (PMMA) and polycarbonate. Such plastic cores are relatively inexpensive to produce when compared with glass and are finding application in the communication industry where flexibility is not a desirable property.

The key to developing an optical waveguide is selecting materials which are highly transparent to the wavelength being transmitted. Optical waveguides have a "core"; that is, an elongate optically transparent path through which light may pass. Conditions must be created to induce the light waves which travel inside of the optical waveguide to remain in the core and not leak out of the sides of the fiber. To that end, a reflective material is coated onto the outside of the core material which acts as a mirror to bend the light back into the fiber core in a process known as total internal reflection (TIR). This outer coating is called the cladding.

The physical properties of light waves are such that as light is transmitted from one medium to another it bends or is refracted slightly at a predictable and repeatable angle. This property is known as the index of refraction. For TIR to occur, the index of refraction of the core material must be greater than the index of refraction of the cladding material. The greater the disparity between the refractive indices of the two materials, the greater the acceptance angle of the fiber input and the greater the divergence of the output. The numerical aperture (N.A.) is the measure of this disparity.

$$N.A. = (n^2 core - n^2 clad)^{\frac{1}{2}}$$

where n refers to the refractive index of either the core or cladding as indicated.

Since most applications require the output of the fiber to produce a minimally diverging transmission, the most useful fibers have very slight differences between the core and cladding refractive indices, thus a low N.A.

Basically there are three types of fiber optics commercially available for medical application. In each case the core material is glass. Cladding material varies from fiber type to fiber type. The first type of fiber is known as a glass-clad fiber. Usually the material used for the cladding in a glass-clad fiber is the same as the core material but doped with fluorine. The fluorine doping process changes the refractive index of the cladding material only slightly allowing the fiber to have a low N.A. (as low as 0.1).

The second type of fiber is known as plastic clad silica or PCS. The core material is again silica or glass. The cladding of PCS fiber is usually silicone. The silicone material is chosen for its optical properties to produce fibers with an N.A. from 0.3–1.0.

The third and newest type of fiber is known as hard clad silica or HCS. The cladding material of HCS is one of a family of polymers with optical properties which induce TIR. HCS fiber often has a relatively high N.A. (greater than 0.35)

Telecommunication applications dominate the optical fiber market. Kilometers of fiber optic cable are used where copper cable was previously employed. Because conditions are often harsh and the environment often corrosive, protecting the fragile glass core is a primary concern.

Thick buffers and jackets are incorporated into the optical fiber to protect the core. This causes the total diameter of the fiber to become quite large. A large outer diameter (OD) reduces the flexibility of the fiber dramatically (as the diameter of the fiber is doubled, the flexibility of the fiber is reduced by a factor of four), but, as mentioned earlier, flexibility is not a great concern for telecommunication applications.

The requirements for optical waveguides for medical applications are quite different from optical waveguides used for communications. Medical applications often require very short lengths of fiber (less than 5 meters). A medical fiber optic is often disposable (single use), short length, flexible, and has a large core diameter to outer diameter ratio (core/OD). Disposable fibers do not need the bulky buffers and jackets developed for communication which considerably reduce the overall fiber flexibility. Since waveguides are often used with an endoscope, small flexible fibers must be employed. To achieve this flexibility while maintaining a large cross section, multifiber bundles must be used to simulate a large core fiber. This arrangement produces considerable dead space (areas of the cross section which are not occupied by the actively transmitting core). Dead space can account for up to 50% of the cross-sectional area.

To meet the need of the medical community and other fiber markets which require short length, flexible, large core, high core/OD ratio transmission of laser energy, a silicone waveguide has been conceptualized. By proper selection of elastomers, a core and cladding configuration similar to glass fibers can be fabricated to produce a fiber with an N.A. as low as 0.17.

Because silicone is so flexible, a large core waveguide can be produced with a 600 micron core, but able to negotiate tortuous bends similar to a 100–200 micron core glass fiber. The cost of producing such a waveguide would be favorable compared to glass. Such a silicone-cored waveguide would be particularly useful for distributing illuminating light from a central source to remote points as, for example, is desirable in automotive and commercial and residential construction applications.

In summary, the advantages of a silicone waveguide over the prior art glass core fiber optics or waveguides for medical application involving introduction of the waveguide with the body are:
1. Greater flexibility than glass for the same core/OD ratio (especially in a large core waveguide).
2. Shatterproof.

3. Large core/OD ratio possible with much less dead space than bundled glass waveguides of the same total outer diameter with increased flexibility.
4. Costs no more than a glass waveguide.

SUMMARY OF THE INVENTION

It is an object of this invention to provide a flexible optical waveguide possessing a large core diameter for distribution of illuminating light from a source to a target.

It is still a further object of this invention to provide a flexible optical waveguide for the transmission of visible and/or near infrared light from a source to a target wherein the core diameter is large.

It is another object of this invention to provide an optical waveguide for the delivery of visible and near infrared light to target tissue located beneath the skin.

It is yet another object of this invention to provide an optical waveguide for general illumination and specific medical applications wherein the core material and finished waveguide is highly flexible.

It is still a further object of this invention to provide an optical waveguide which is substantially transparent to visible and near infrared wavelengths of light.

It is yet another object of this invention to provide an optical fiber for medical use wherein the optical fiber has a large core cross-sectional area having minimum dead space.

It is still another object of this invention to provide an optical waveguide that exhibits a high modulus of elasticity.

It is a final object of this invention to provide a flexible optical waveguide for the delivery of light to tissue beneath the skin for medical purposes wherein the cost of production of the waveguide is modest.

DESCRIPTION OF THE PREFERRED EMBODIMENT

Figure 1:
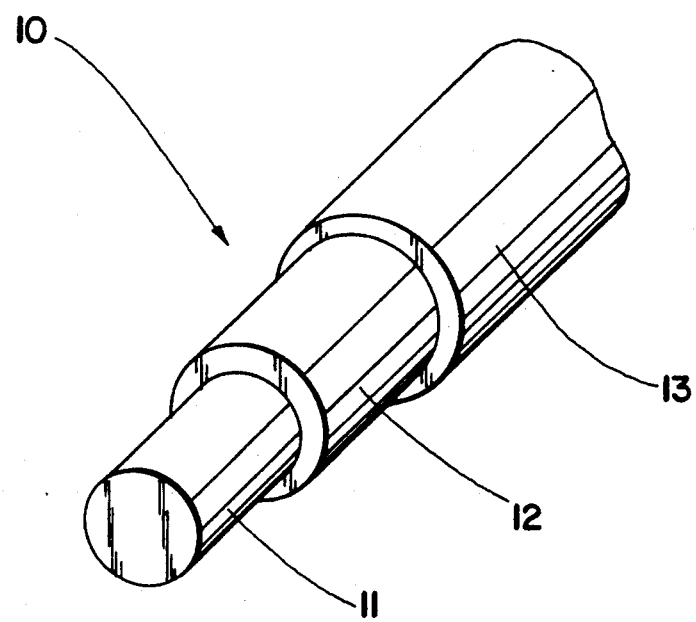
FIG. 1 is a perspective view of an optical waveguide of the present invention.
Figure 2:
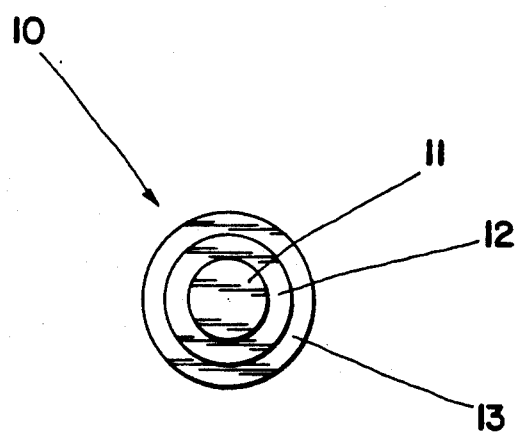
FIG. 2 is a cross-sectional structure of a silicone optical fiber having a silicone core and plastic cladding.

Referring now to FIGS. 1 and 2, a preferred embodiment of an optical waveguide of the present invention is shown in both perspective (FIG. 1) and cross-section (FIG. 2). An optical fiber 10 is produced by fabricating a single silicone optical core 11 within a cladding coating 12. The cladding coating 12 has a lower index of refraction than the core material 11 rendering it light-reflecting and made, for instance, of an impregnated or doped silicone resin. A jacketing layer 13 is provided around the core and cladding for durability and to prevent entry of ambient light into the waveguide. After drawing of the optical fiber core 10, the cladding 11 may be dip-coated on the outside of the core and heat cured, thereby to provide a reflective surface around the core. The thickness of the cladding coating 11 should be sufficient to provide a desired level of reflection.

A silicone optical waveguide was fabricated by dipping an extruded optically transparent silicone core (McGhan Nusil Catalog No. CFI-6755) into a cladding composition comprising silicone of a different refractive index (McGhan Nusil R-2655) and allowing the coated core to cure beneath a protective surrounding jacket of PFA Teflon ®. The jacketed assembly comprised an optical waveguide with an outer diameter of 600 microns. This waveguide exhibited a flexibility better than that exhibited by a 200 micron glass fiber and produced total internal reflection of light down the length of the waveguide.

The terms and expressions which have been used are used as terms of description and not of limitation and there is no intention in the use of such terms and expressions of excluding any equivalence of any of the features shown or described or portions thereof. Moreover, various modifications in the preferred embodiment are possible within the scope of the claimed invention.

What I claim is:

1. An optical waveguide for the transmission of illuminating light from a 1 light source to a point remote from said light source, said optical waveguide comprising, in combination:
   (a) an elongate, cylindrical silicone core having a diameter between 50–1000 microns, said silicone core having a first index of refraction and being optically transparent to at least one wavelength of light in the range 400–1100 nanometers; and
   (b) a cladding material surrounding said silicone core wherein said cladding material comprises an elastomer having a second index of refraction which is less than said first index of fraction of said silicone core.

* * * * *